(12) United States Patent
Fairs et al.

(10) Patent No.: US 8,130,194 B1
(45) Date of Patent: Mar. 6, 2012

(54) NON-MOUSE DEVICES THAT FUNCTION VIA MOUSE-LIKE MESSAGES

(75) Inventors: James R. Fairs, Naperville, IL (US);
Lee A. Mitchell, Hughesville, PA (US);
Vlad Zarney, Calabasas, CA (US);
Michael J. Borch, Chicago, IL (US)

(73) Assignee: IMI Innovations, Inc., Naperville, IL (US)

( * ) Notice: Subject to any disclaimer, the term of this patent is extended or adjusted under 35 U.S.C. 154(b) by 1090 days.

(21) Appl. No.: 11/641,147

(22) Filed: Dec. 18, 2006

(51) Int. Cl.
*G09G 5/08* (2006.01)

(52) U.S. Cl. ........ 345/157; 345/162; 345/163; 370/537; 710/20; 710/21; 715/856; 715/861

(58) Field of Classification Search .......... 345/156–168, 345/2.1; 370/537, 538, 540; 710/20, 21; 715/856–861
See application file for complete search history.

(56) References Cited

U.S. PATENT DOCUMENTS

| | | | | |
|---|---|---|---|---|
| 4,760,386 A * | 7/1988 | Heath et al. | .................... | 345/180 |
| 5,157,384 A * | 10/1992 | Greanias et al. | ............. | 345/156 |
| 5,298,918 A * | 3/1994 | Yen-Chen et al. | ............ | 345/163 |
| 5,801,696 A * | 9/1998 | Roberts | ......................... | 715/781 |
| 5,835,498 A * | 11/1998 | Kim et al. | ..................... | 370/537 |
| 5,917,472 A * | 6/1999 | Perala | ............................ | 345/157 |
| 6,008,777 A * | 12/1999 | Yiu | ............................... | 345/2.1 |
| 6,075,517 A * | 6/2000 | Frid | ............................... | 345/156 |
| 6,359,610 B1 * | 3/2002 | Shah et al. | ..................... | 345/156 |
| 6,615,283 B1 * | 9/2003 | Kuo | ................................... | 710/1 |
| 6,711,182 B1 * | 3/2004 | Gibbs et al. | ..................... | 370/537 |
| 6,727,884 B1 * | 4/2004 | Leatham et al. | ............. | 345/156 |
| 6,909,722 B1 * | 6/2005 | Li | .................................. | 370/412 |
| 6,983,336 B2 * | 1/2006 | Kikuchi et al. | ................. | 710/16 |
| 7,620,900 B2 * | 11/2009 | Kawashima et al. | ......... | 715/754 |
| 7,802,265 B2 * | 9/2010 | Fairs et al. | ..................... | 719/321 |
| 7,825,896 B2 * | 11/2010 | Yoshida | ....................... | 345/157 |
| 7,836,461 B2 * | 11/2010 | Fairs et al. | ..................... | 719/321 |
| 7,928,959 B1 * | 4/2011 | Fairs et al. | ..................... | 345/156 |
| 2004/0233168 A1 * | 11/2004 | Christenson | .................. | 345/163 |
| 2005/0068300 A1 * | 3/2005 | Wang et al. | ..................... | 345/166 |
| 2005/0140655 A1 * | 6/2005 | McLoone et al. | ............. | 345/168 |

* cited by examiner

*Primary Examiner* — Lun-Yi Lao
*Assistant Examiner* — Gregory J Tryder
(74) *Attorney, Agent, or Firm* — Fernandez & Associates, LLP

(57) ABSTRACT

Method and system for generating and processing multiple independent input data streams based on a high priority OS message framework such as an OS provided framework for processing mouse-messages. Multiple input devices generate motion that is sensed by motion sensors located on one or more motion sources, quantify the sensed motion, and provide resulting input data to a computer via one or more communication ports. One or more software subroutines process the provided data, separating them into multiple independent input streams according to their sources, and sending the streams to listening applications. The subroutines are preferably integrated at a low level of the OS architecture, thereby enabling low-latency, fully-functional high priority processing of the input data.

26 Claims, 12 Drawing Sheets

Encoder Data is passed to IMI Software via standard USB, and assigned to appropriate functionalities.

NON-MOUSE DEVICES THAT FUNCTION VIA MOUSE-LIKE MESSAGES

CROSS REFERENCE TO RELATED APPLICATIONS

This application is related to the following, all of which are incorporated herein by reference in their entirety: co-pending U.S. patent application Ser. Nos. 11/001,328 filed on Nov. 30, 2004, 11/123,934 filed on May 5, 2005 and 11/172,631 filed on Jul. 1, 2005.

BACKGROUND

1. Field

The invention relates to input devices, and in particular to generating and processing multiple independent mouse-message (and similar protocol framework) based input data via hardware and their further processing using specialized software.

2. Related Art

Various hardware items exist which are integrated in some form or another with a computer. Examples include computer keyboards, standard computer mice, pen mice, tablets, etc. Other hardware, such as musical keyboards and other instruments have also been adapted to work a computer interface utilizing MIDI (Musical Instrument Digital Interface) and other systems and protocols. In the case of mouse message-based devices, such as standard computer mice, pen mice, etc., there is generally low latency or low "lag" in the relationship between the sensed motion (i.e. human action) and the computer response. This is due to the integration of mouse messages with lower layers of the operating system (OS). However, since the OS combines the data it retrieves from multiple pointing devices and treats the combined data as representing a single pointing device seen by applications as a single mouse, there is no independence between multiple devices generating mouse messages (and similar protocol framework messages). Conversely, while devices such as musical instruments using MIDI do achieve a level of independence, they suffer from a lack of flexibility and design, as well as from latency issues due to the layers of messaging required for performance.

Accordingly, there is a need for improved methods and systems allowing design and use of a variety of mouse-message and similar protocol framework message-based devices and tools, offering a variety of new functionalities, integrated with a specialized software layer that recognizes and renders the device or tool input data separately and simultaneously at a low level of the OS architecture.

SUMMARY

Method and system for generating and processing multiple independent input data streams based on a high priority OS message framework such as an OS provided framework for processing mouse-messages. Multiple input devices sense motion originating from one or more motion sources, quantify the sensed motion, and provide resulting input data to a computer via one or more communication ports. One or more software subroutines process the provided data, separating them into multiple independent input streams according to their sources and sending the streams to listening applications. The subroutines are preferably integrated at a low level of the OS architecture, thereby enabling fully-functional high priority processing of the input data.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present embodiments disclose techniques which enable the design and processing of a variety of independent input devices and their signals, wherein the devices have their data streams based on a high priority OS message framework (hereinafter abbreviated as "message framework"). One example of such a message framework is an OS provided framework for processing mouse-messages. In the interest of conciseness and ease of illustration, unless otherwise indicated, the embodiments disclosed herein are described using mouse-message based data as the example of the message framework used. However, this is for ease of exposition only, and it is understood that other message frameworks can be used as the underlying messaging protocol for the input streams.

In the embodiments, the devices provide input data to a computer via one or more communication ports. One or more software subroutines process and separate the data into independent mouse-message based data streams and send the streams to listening applications for recognizing and rendering the input data of such devices. The software system is preferably integrated at a low level of the OS architecture, thereby enabling low-latency processing of the input data.

The invention allows for the independent and simultaneous use of flexible and low-latency devices by reference to and integration with the embodiments described in patent application Ser. Nos. 11/001,328 filed on Nov. 30, 2004, 11/123, 934 filed on May 5, 2005 and 11/172,631 filed on Jul. 1, 2005.

Figure 1:
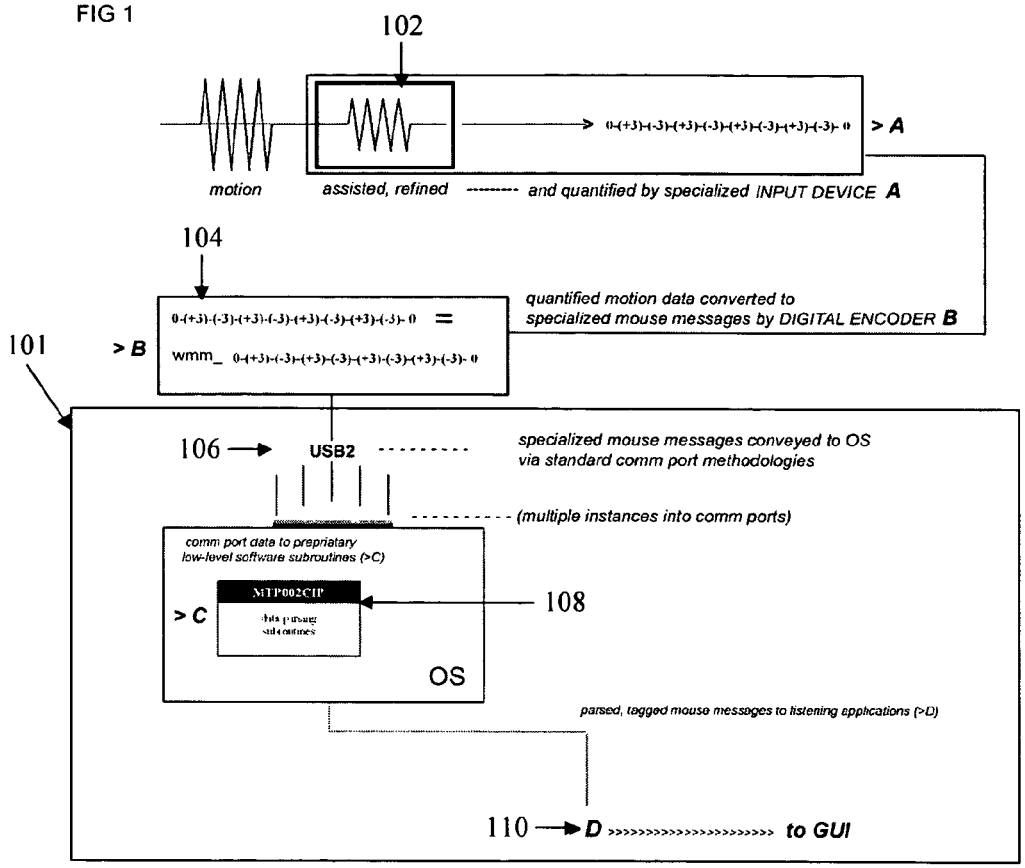
FIG. 1 is a diagram illustrating a system for processing independent input data, in accordance with an embodiment of the present invention.

FIG. 1 is a diagram illustrating a system for processing independent mouse-message based input data, in accordance with an embodiment of the present invention. An input device 102 attached to a computer 101 sense's motion from a user or other source of motion. The input device 102 may be a mouse, a mouse-based tablet, a mouse-based pen, a data fader, a mouse-based rotary encoder, a turntable, or any other input device capable of generating mouse-message based input data indicative of sensed motion. The input device 102 quantifies the sensed motion and forwards the quantified motion data to a digital encoder 104.

The digital encoder 104 comprises circuitry for translating the received motion data into mouse messages. The mouse messages mirror the basic mouse messages of the OS. For example, in a Microsoft™ Windows™ OS environment, the mouse messages mirror the basic 35 Windows mouse messages such as wm_LEFTCLICK, wm_RIGHTCLICK, etc., but instead appear as wmm_LEFTCLICK, wmm_RIGHTCLICK, etc.

The specialized mouse-messages are conveyed to the OS via one or more communication ports 106, such as a Universal Serial Bus (USB) port, a PS-2 port, or any other data port capable of transmitting mouse messages. For example, an Ethernet port could be used for the transmission of such data, since when the OS is directed to read such data stream it would recognize the data as mouse messages. Optionally, multiple instances of such mouse-message based input data streams may feed into multiple communication ports 106.

One or more software subroutines 108 process said communication port data and separate the mouse messages. This processing is described in above-referenced U.S. patent application Ser. Nos. 11/001,328 filed on Nov. 30, 2004, 11/123,934 filed on May 5, 2005 and 11/172,631 filed on Jul. 1, 2005. The subroutines 108 separate the mouse messages, tag them by numbers or other identifiers of the originating input device 102, and pass them on to listening applications. The subroutines 108 are preferably integrated at a low level of the OS architecture in order to enable low-latency processing of the input data.

In a case where a standard mouse is attached to computer 101 in addition to another mouse-message based input device 102, the subroutines 108 separate the input data originating from input device 102 from the input data originating from the standard mouse as part of the processing, thereby enabling multiple independent input data streams. Similarly, when a plurality of mouse-message based devices 102 are attached to computer 101, the subroutines 108 separate the input data originating from the input devices 102, thereby producing multiple independent input data streams.

Figure 2:
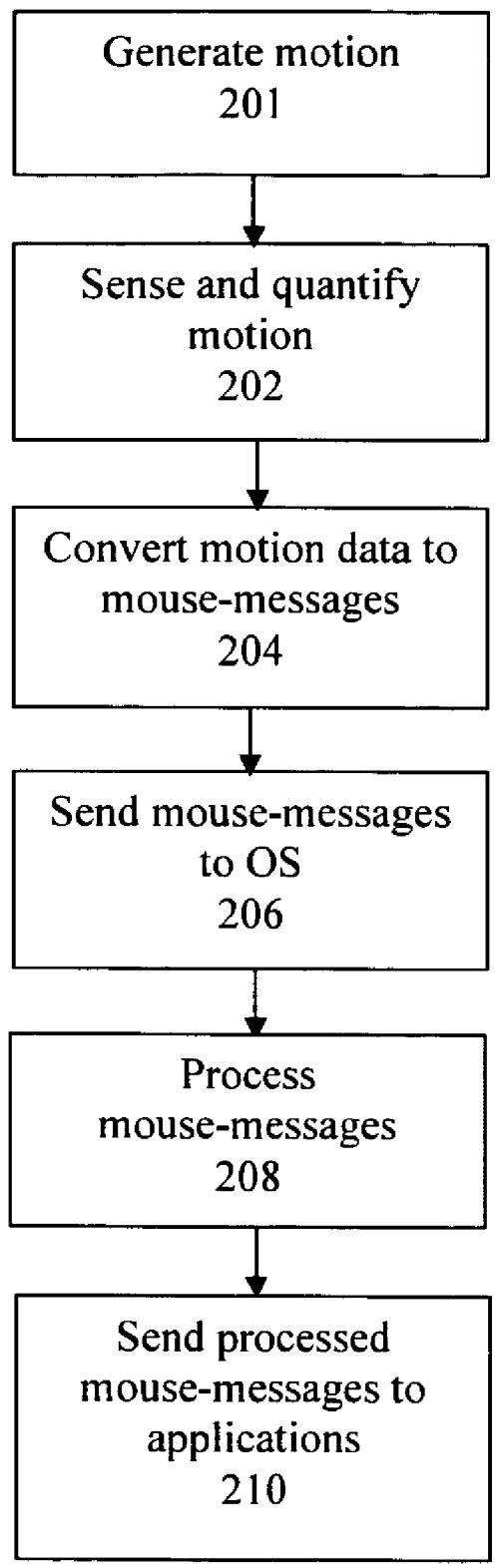
FIG. 2 is flow chart illustrating a method for processing independent input data, in accordance with an embodiment of the present invention.

FIG. 2 is flow chart illustrating a method for processing independent mouse-message based input data, in accordance with an embodiment of the present invention. At step 201, motion is generated using an input device 102. At step 202, the input device senses and quantifies the generated motion. Steps 201 and 202 typically occur concurrently as input device 102 senses and quantifies as the motion is being generated. At step 204, the quantified motion data is converted to mouse-message based data, and at step 206 the mouse-message based data is sent to the OS. At step 208, software subroutines process the mouse-message based data, wherein processing comprises separating and parsing and/or tagging the data into one or more mouse-message based data streams. At step 210, the data streams are sent to one or more listening applications.

Workstation with Multiple Inputs

Figure 3:
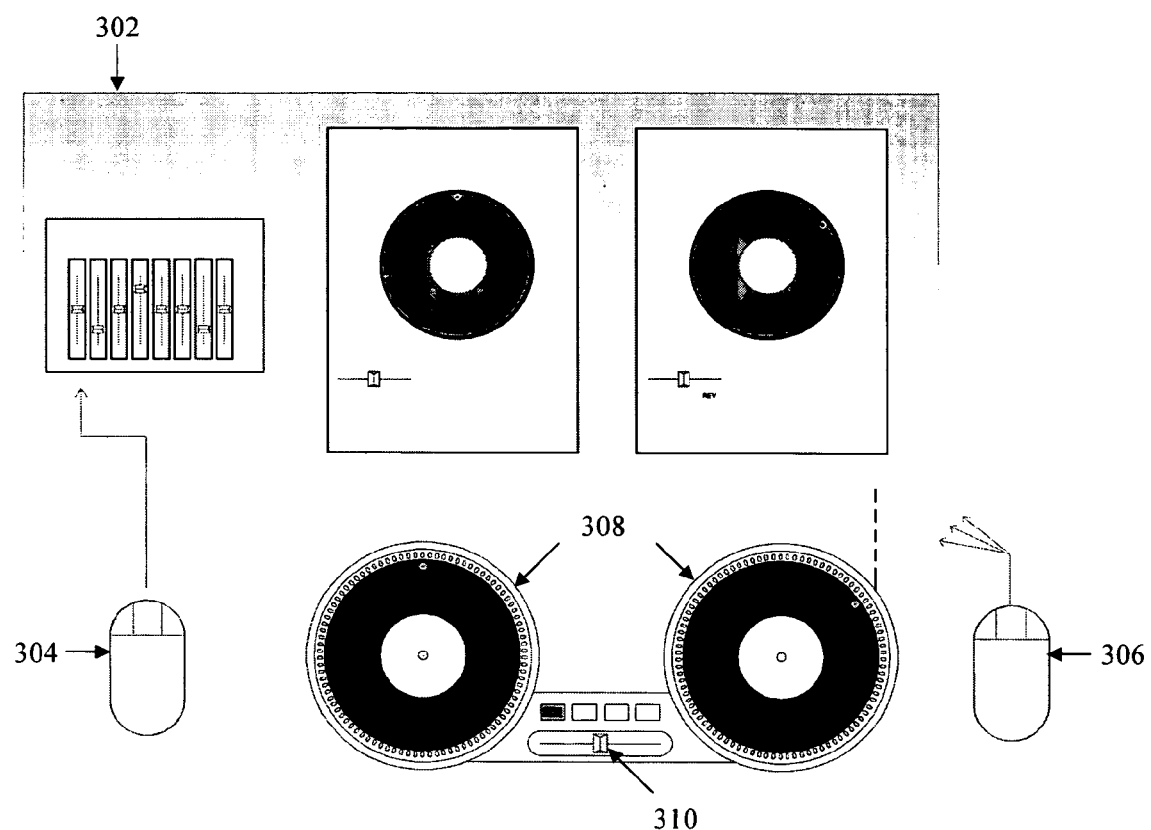
FIG. 3 illustrates a single-user music processing system, according to an embodiment of the present invention.

FIG. 3 illustrates a single user, multiple input music processing system 302 enabled by techniques presented herein, according to an embodiment of the present invention. The system 302 comprises turntable software, bimanual mixing software, a primary mouse 306, a secondary mouse 304, a software wrapper for processing mouse-messaged based input data originating from mice 304 and 306, one or more turntables 308, a crossfader 310, and one or more sources of recorded music or other sounds. Primary mouse 306 is configured to operate as a standard mouse on top of the OS. Secondary mouse 304 is configured to operate with the bimanual mixing software application.

One of the challenging tasks of coordination is that of target acquisition. Since many users are right-handed, their left (non-dominant) hand has a particular difficulty with target acquisition tasking. This problem can be mitigated by restricting non-dominant hand gestures to controls that do not require fine motor control, such as 'locking' the left hand (i.e. the secondary mouse 304) to the faders or knobs on the bimanual mixing software. For example, a right-click on the secondary mouse 304 may be configured to move it to the right across the faders, and a left-click to move it back to the left, allowing the left hand full access to all the mixing modules and eliminating target acquisition as an issue in the process.

Input data indicating motion originating from the one or more turntables 308 and the crossfader 310 are converted to mouse-message based input data, as described above. Input data indicating motion originating from primary mouse 306 and secondary mouse 304 do not need to be converted since they are already mouse-message based. The mouse-message based data are then separated and parsed and/or tagged as part of the processing performed by the software wrapper. This produces multiple and independent mouse-message based input data streams, thereby affording low-latency processing of the input data and an immediacy that is ordinarily associated with the operation of a single standard computer mouse attached to a computer, while at the same time enabling a variety of input devices to function independently. Furthermore, this is in contrast to traditional systems that use MIDI data streams which offer less functionality and can become latent due to the necessary messaging layers generally required for MIDI performances, whereas in contrast the present invention enables priority processing of the input data. Furthermore, MIDI data streams generally require substantial advance set-up and therefore ultimately leave users with a less than satisfactory experience. As another advantage, using mouse-message based input to control graphical user interface (GUI) functions (instead of using MIDI messages for that purpose) allows for better system resource allocation which in turn improves the performance of the now less-taxed MIDI messages. As yet another advantage, the input processing techniques presented herein are highly functional, since mouse messages are designed to click, scroll, select, etc., which are highly desirable functions when working with applications, in contrast to MIDI and machine messages, which were not designed for these purposes.

The present example music processing system 302 generates three independent, virtually zero latency data streams, and the resulting experience combines the tactile immediacy of analog components with the feature capabilities of software. Additionally, because mouse-messages are used, any device, be it a standard mouse or a another mouse-message based hardware device, has the potential to access stored data with the speed to which digital computer users have become accustomed.

Workstation with Multiple Users

The presence of multiple input devices offers the potential for multiple users. As result, two users, such as two Disc Jockeys (DJs), may interact on the same system and at the same time. For example, a first DJ may operate the system 302 and perform primary DJ functions such as beat matching tracks, selecting and crossfading content, scratching, etc. A second DJ may add sounds, textures and performance layers. The left hand of the first DJ is free to move from one fader to another fader with the simple click of a mouse, while the right hand is free to make other mixer adjustments and content selections. A computer keyboard may be used by the second DJ, enabling the renaming of files and the entering of keyboard commands. A particular embodiment of the present system 302 can be implemented using a laptop and a side screen.

Figure 4:
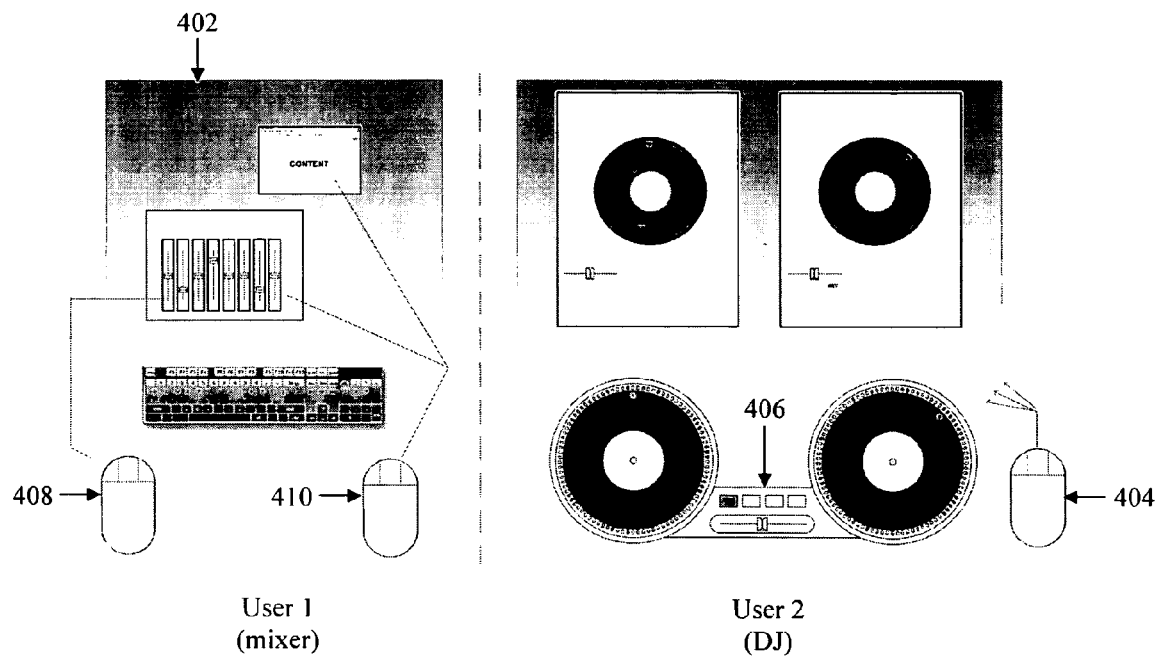
FIG. 4 illustrates a multi-user music processing system, according to an embodiment of the present invention.

FIG. 4 illustrates another music processing system 402 enabled by techniques presented herein, according to an embodiment of the present invention. The system 402 comprises multiple mouse-message based input devices, providing an opportunity for multiple users (such as a DJ and a mixer) to perform, for example, a full multimedia show from a single workstation.

This particular example setup comprises a PS-2 and two or more USB inputs. A primary mouse 404 is plugged into a PS-2 port and has access to user interface and OS functions. A component 406 (hereinafter referred to as "turntable emulator" is plugged into one of the USB ports. Turntable emulator 406 is a specially designed device which emulates functionalities of a motorized turntable, but without the use of motors. Instead, turntable emulator 406 emulates turntable functionalities in an environment in which mouse-message based data streams allow for multiple independent inputs, such as enabled by the techniques of the present invention in the present setup. We will describe the design of the turntable emulator 406 in more detail below.

A secondary mouse 408 is plugged into another port and is used, similar to the above setup 302, may be constrained to the faders of the bimanual mixing software and used to move from one fader to another fader with simple mouse clicks. Optionally, another mouse 410 may have a right-handed cursor associated with it (to visually correlate with the right hand of the mixer) and can also be restricted to operate only within the bimanual mixing software. As one example, with two independent mice the mixer is enabled to use two-handed fader adjustments (e.g. simultaneously adjusting one fader up and another fader down) or to change the content that is being mixed.

A typical session calls for content setup in advance (both 'in-play' and 'on-deck'), with the bulk of the manipulations and crossfading occurring on the turntable emulator 406. New content and user interface functions are handled by the primary mouse 404, and occasionally new textures and grooves may be fed into the mix with the left hand using the bimanual mixer software.

Figure 5A:
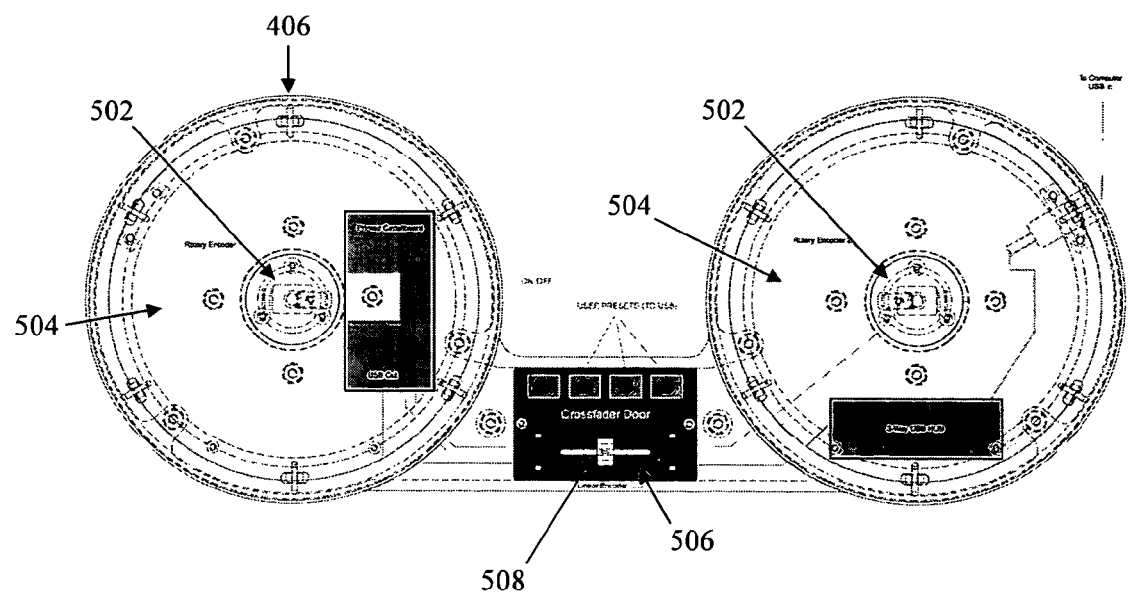
FIGS. 5a, 5b and 5c illustrate turntable emulators, according to embodiments of the present invention.
Figure 5B:
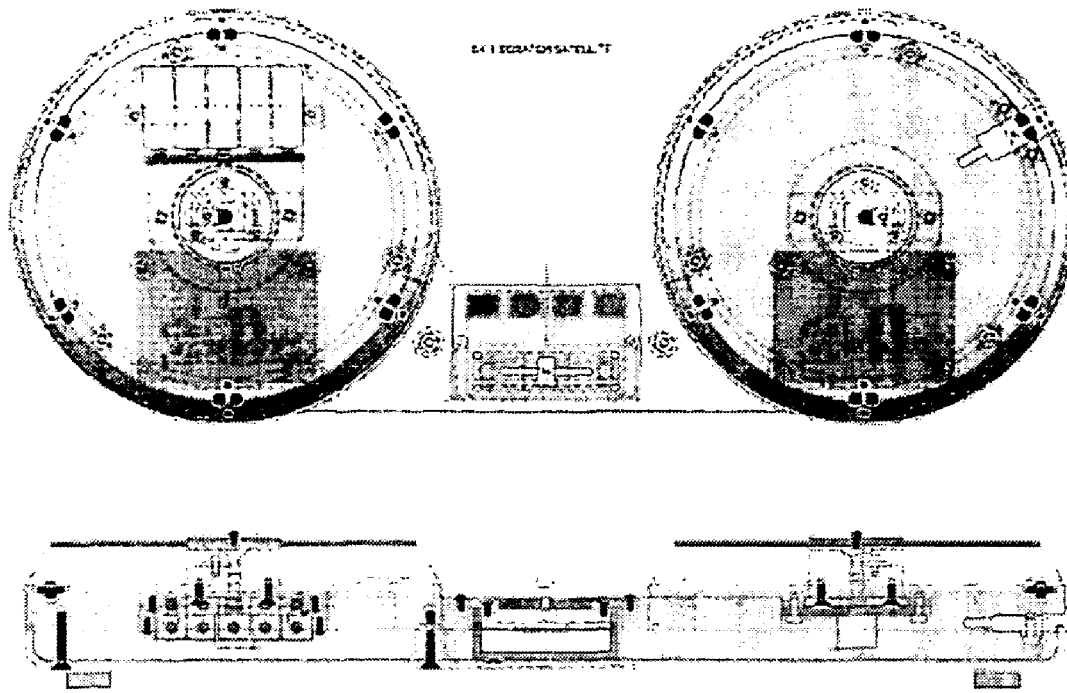

We now turn to describing the design of turntable emulator 406. As mentioned above, component 406 emulates functionalities of motorized turntables, but without the use of motors. FIGS. 5a and 5b show views of an example design of a turntable emulator 406, in accordance with an embodiment of the present invention. Referring to FIG. 5a, instead of using motors, the turntable emulator 406 comprises rotary encoders 502 under vinyl discs 504, and a linear encoder 506 under a crossfader 508. The movements of the encoders 502 and 506 are translated to mouse-messages based data and joined within the unit via a three-way USB hub (while a hub is used herein for illustration, it is not necessary and multiple endpoints can be used instead of a USB hub). A USB cable connects the three devices to a computer. The computer sees the incoming data streams as three mice and supplies legacy drivers for the hardware. The software (comprised of the GUI bimanual mixer and turntables) can be augmented by a software development kit and enabled to parse and assign the turntables from the turntable emulator 406 to the correlating turntables in the GUI. The crossfader in the software is assigned to the crossfader 508 (i.e. the output of the linear encoder 506) on the turntables. The result is the emulation of the functionalities of motorized turntables, but without the use of motors. Note that while USB protocols are used herein, it is for illustrative purposes only and it should be noted that the disclosed techniques can be used just as well with other protocols.

In particular, the linear encoder 506 outputs its absolute position when queried by the microcontroller (MCU). When the MCU retrieves the current position of the fader it subtracts the last known position from the current position to determine the relative movement since the last query. This relative movement is then transmitted as a horizontal mouse movement via USB to the computer for further processing. To illustrate with an example: the fader 506 may be configured to output its position from 0 (fully left) to 127 (fully right). If the last known position of the fader was say 63 (approximately center), and the MCU queries the current position which happens to be 70 (slightly right of center), then the MCU subtracts the current position (63) from the last known position (70) resulting in 7. The MCU will then send a mouse message consisting of a horizontal movement to the right of 7 positions.

Turning to the rotary encoder 502, its circuit consists of two sections, a decoder and a USB interface (or other similar communication interface). The rotary encoder 502 cycles its two output channels (which are in quadrature) as they detect rotation. The decoder MCU monitors the two output channels to determine when, and in which direction, movement has occurred. If a clockwise movement is detected, the movement counter is incremented by 1. If a counter-clockwise movement is detected, the movement counter is decremented by 1. When a USB MCU queries the decoder MCU, the decoder MCU transmits the value of the movement counter, which corresponds to the relative movement since the last mouse message. The movement counter is then reset to 0 by the decoder MCU and the USB MCU transmits the value it received from the decoder MCU via USB to the computer for further processing.

A high level algorithmic description of the behavior of a USB MCU (or an MCU for other interface) is as follows:
1. Wait for computer to become available for reception of new mouse message.
2. Query decoder MCU for movement.
3. Transmit the received value of movement counter as a horizontal mouse movement via USB to the computer.
4. GOTO step 1.

As an example, consider a decoder MCU monitoring two channels coming from an optical encoder. A particular example scenario may proceed as follows:
1. A DJ rotates the record clockwise. Clockwise movement is detected. Movement counter is incremented from 0 to 1.
2. The DJ continues moving the record clockwise. Clockwise movement is detected. Movement counter is incremented from 1 to 2.
3. The DJ begins rotating the record counter-clockwise. Counter-clockwise movement is detected. Movement counter is decremented from 2 to 1.
4. The DJ begins rotating the record clockwise again. Clockwise movement is detected. Movement counter is incremented from 1 to 2.

5. Decoder MCU is queried by the USB MCU. Movement counter is transmitted from decoder MCU to USB MCU.

6. USB MCU transmits the received value of the movement counter as a horizontal mouse movement via USB to the computer. Decoder MCU resets its movement counter to 0.

It is noted that an optional novel functionality of "variable latency" can be introduced here. For example, when an encoder is moved slowly, the latency functions of the supporting logic (whether implemented in hardware or software code) can be relaxed in order to allow the reduced data levels to fill the message cue. When the encoder is moved quickly, the latency functions can be tightened up, since the faster movement requires more immediate response from the processing and the increased data output from the movement fills the message cue more quickly.

Figure 5C:
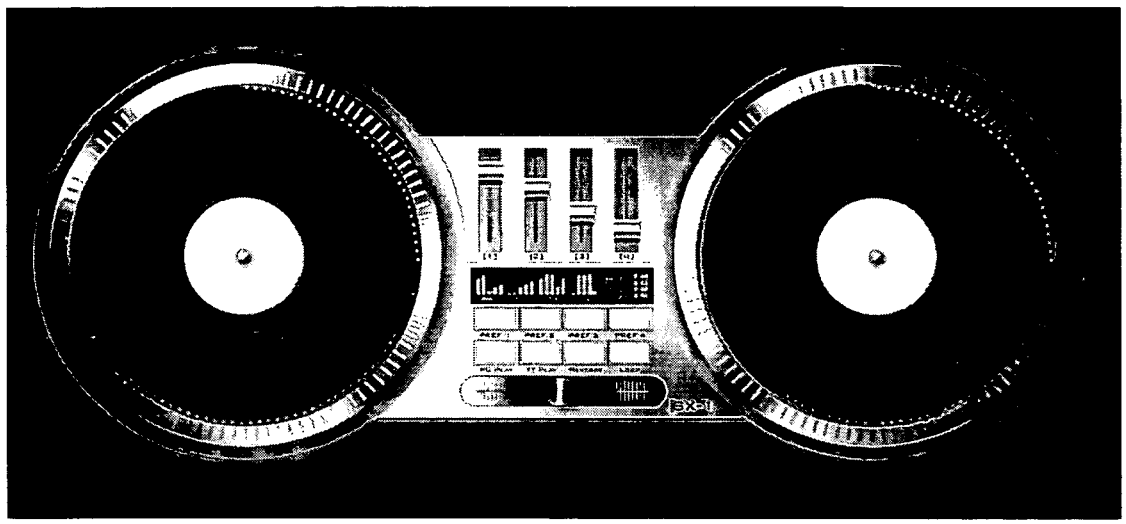

It should be obvious to one of ordinary skill in the art that the components presented herein may be combined in a variety of ways. For example, the faders of the bimanual mixing software (operated by mouse 408 as described above) may be combined with the turntable emulator 406 to produce a hybrid turntable emulator as depicted in FIG. 5c, in accordance with an embodiment of the present invention.

Figure 6:
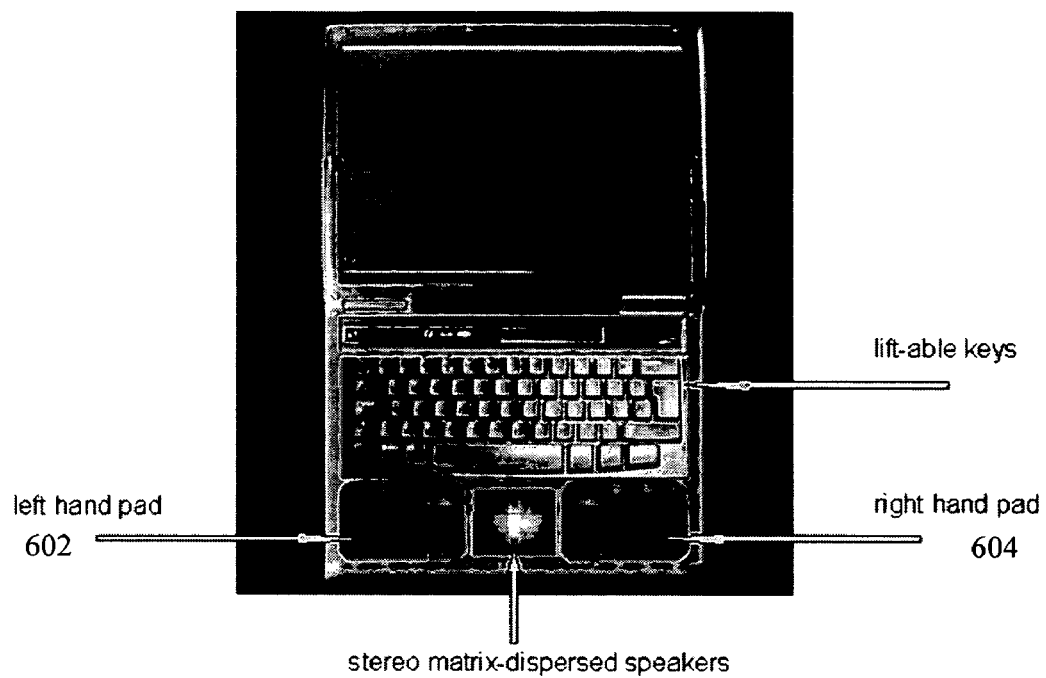
FIGS. 6, 7, 8 and 9 illustrate systems for a classroom, according to embodiments of the present invention.

The present methods for multiple independent input processing enable novel configurations of traditional computing machines, such as laptops (i.e. notebook computers) with multiple touch pads. FIG. 6 illustrates an example two-pad bimanual laptop comprising a left hand touch pad 602 and a right hand touch pad 604, in accordance with an embodiment of the present invention.

Other examples of systems using the present techniques include a drive-by-wire car, with the steering wheel and gas pedal sending their rotary and linear signals in a manner analogous to the turntable and fader examples described above, thereby allowing low-latency processing of the steering and throttle signals for safer driving. Another simple example is a toaster having an up-down slider sending linearly encoded data using mouse-messages provided by an embedded OS.

Multiple Users

Figure 7:
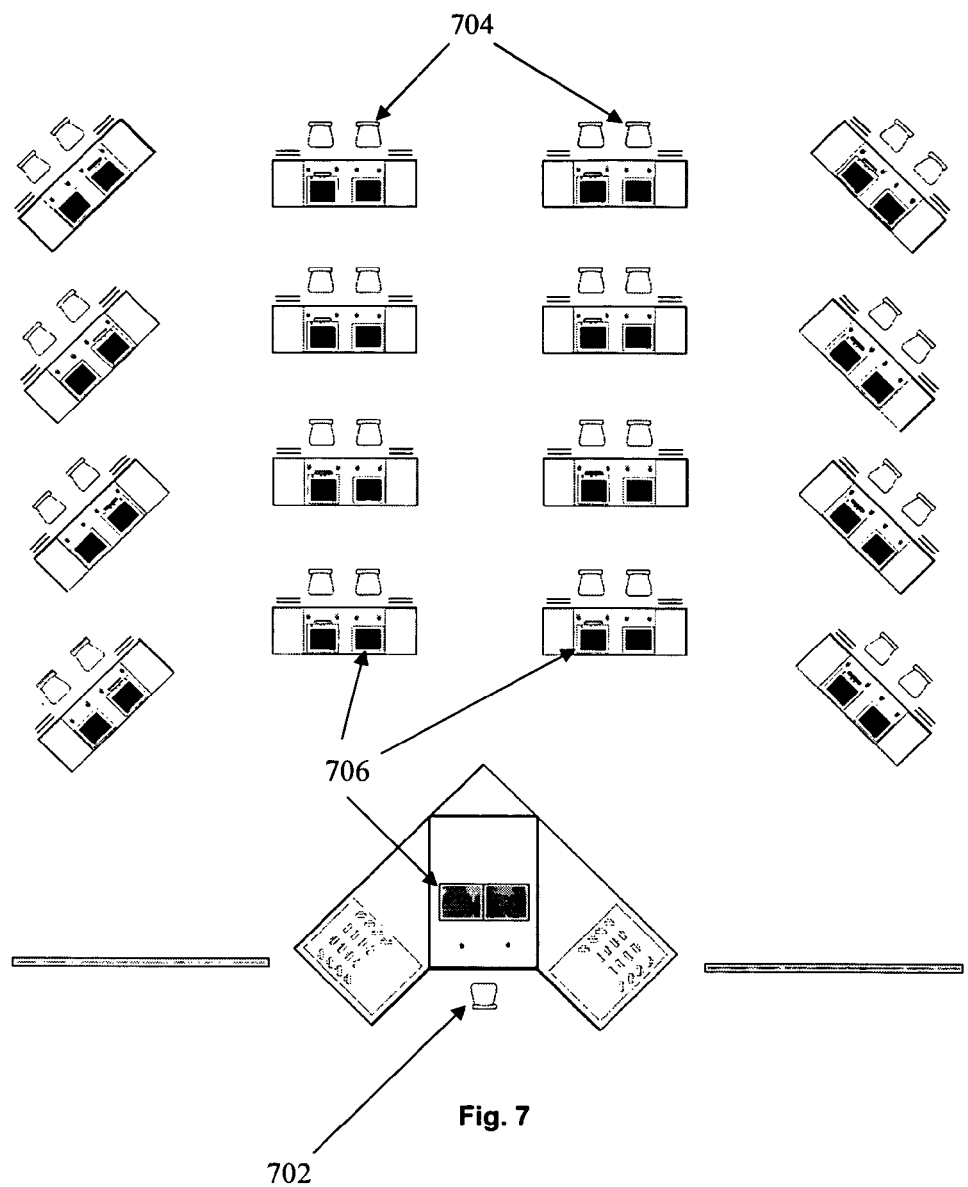
Figure 8:
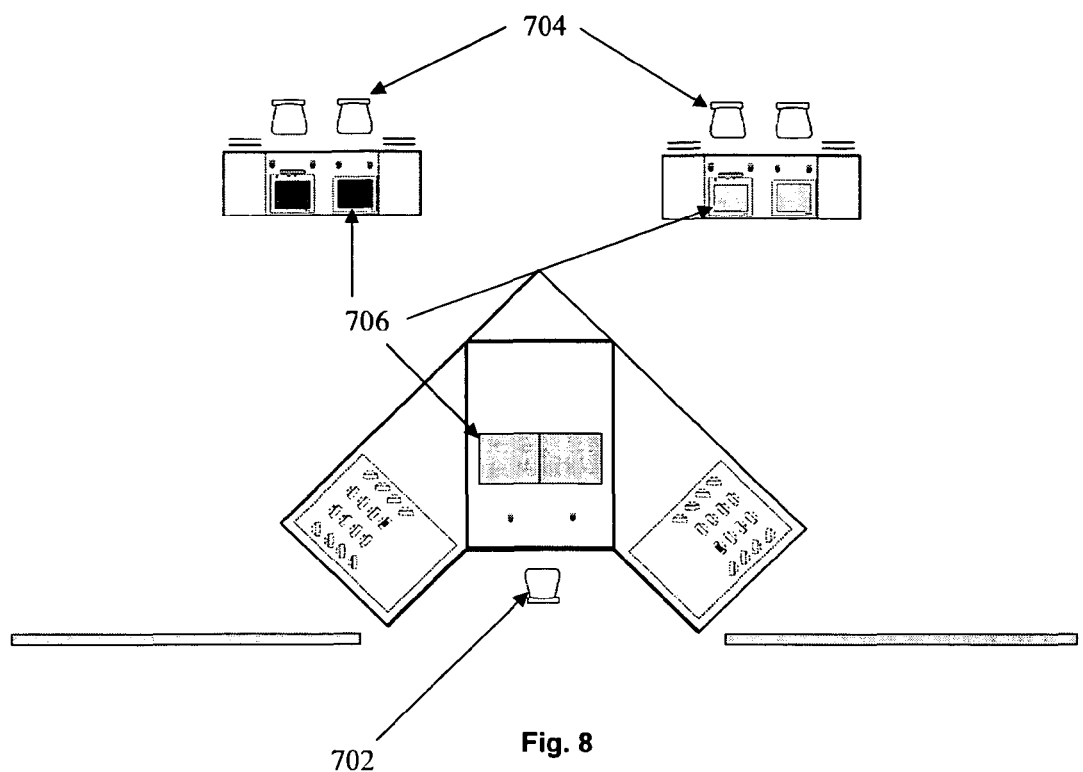
Figure 9:
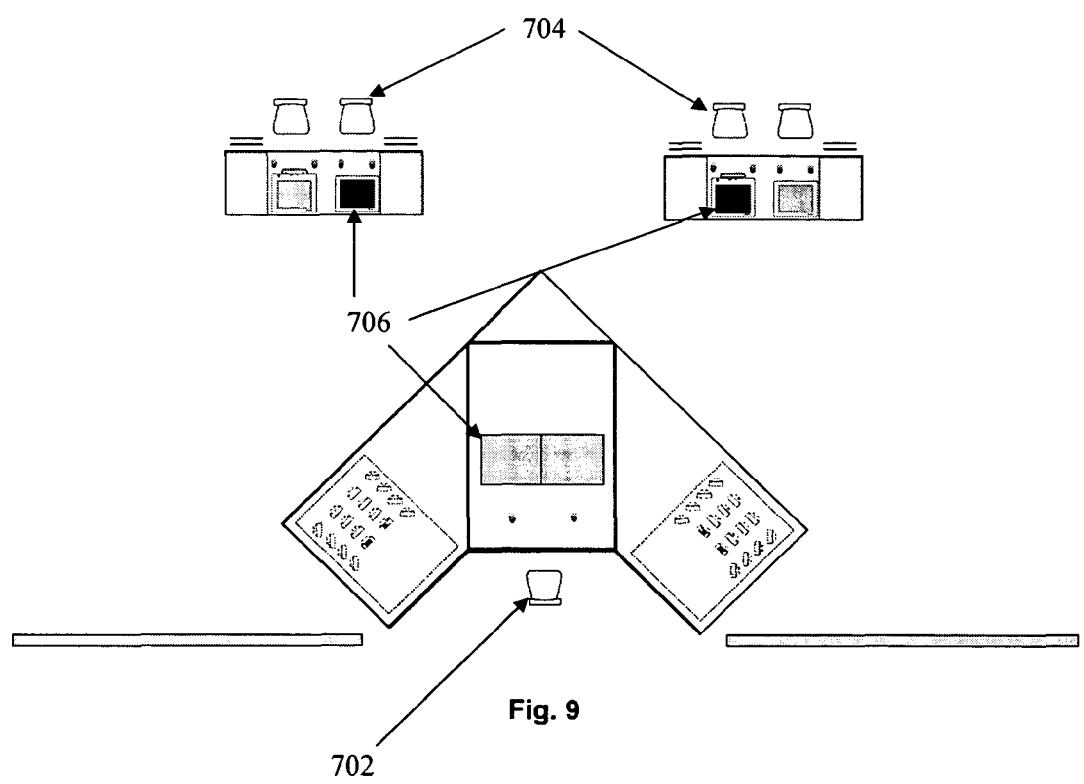

FIGS. 7, 8 and 9 illustrate systems for a classroom, enabled by techniques presented herein and according to embodiments of the present invention. An instructor 602 and students 604 are present in a classroom and have access to computers 606. The computers 606 are configured, as described above, to provide multiple independent inputs via multiple mice. Enabled by the multiple independent input environment, the instructor 602 can create virtual teams from the computers in the classroom. For example, the instructor 602 may request a first student working at a first computer and a second student working at a second computer to work out a problem, at which point both stations move their mouse cursor functions to the instructor's computer (i.e. the instructor's computer accepts the inputs from the instructor's mouse as well as the inputs from the mice of the first and second students). All three cursors then are configured to appear (for example color-coded) on larger screens in the classroom. The three parties (the two students 604 and the instructor 602) are now able to work together on the same screen and within the same virtual environment, allowing direct interaction and more immediate communication. Meanwhile, other preexisting virtual teams in the classroom may continue working on problems privately on their localized screen and environments.

Objects Automation

Optionally, a cursor assistance computer program, hereinafter referred to as "Objects Automation", operates to provide an environment (or an operational mode) wherein cursor movements are restricted to GUI elements by accessing the functionality of GUI elements and control points. In one example implementation comprising one or more primary mice and one or more secondary mice, the Objects mode binds the secondary mice to move from element to element on the GUI, and hides the cursors of the secondary mice. When a secondary mouse is moved, the movement causes one or more application elements, menu items or other GUI elements to be highlighted or otherwise designated as "selected", thereby indicating that an action can be taken on the selected item when the user clicks or double-clicks a button on the secondary mouse. The Objects mode may optionally provide configuration options to indicate colors or other visual aspects of the selected items.

Figure 10A:
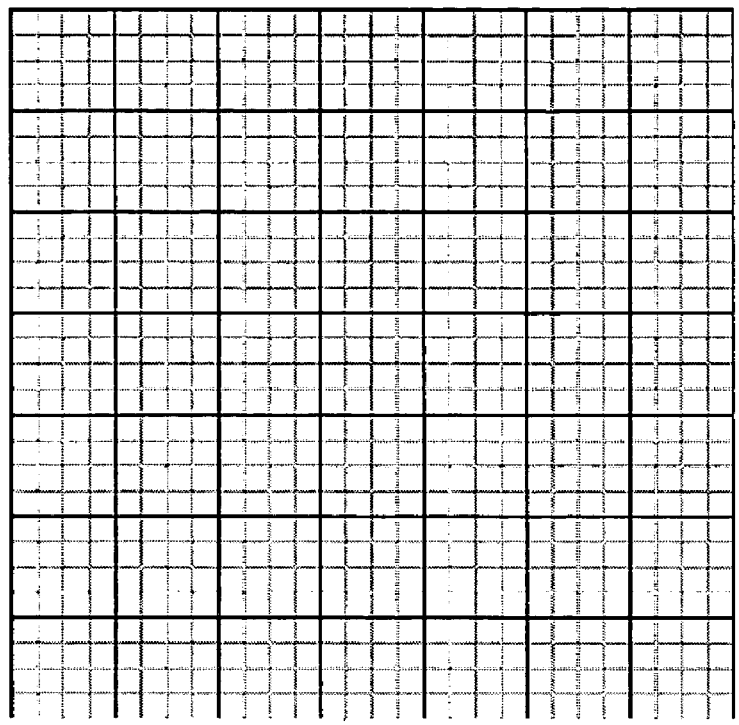
FIGS. 10a-d shows example application interface selections and selection groups, according to example embodiments of the present invention.
Figure 10B:
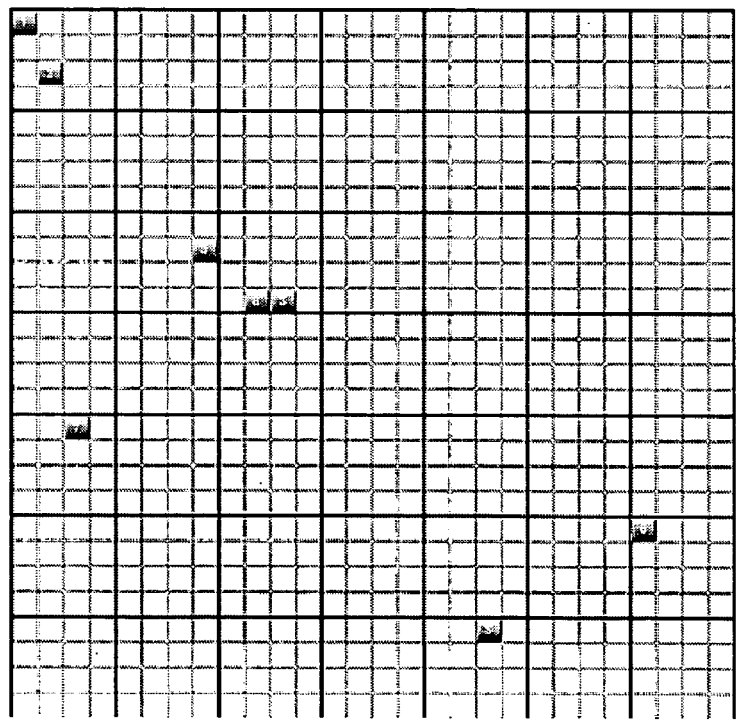

FIGS. 10a-d shows example application interface selections and selection groups, according to example embodiments of the present invention. FIG. 10a shows example application interface selections, wherein each square represents a GUI object, button, control point, or control object offered as selectable for an Objects Automation control object. FIG. 10b shows a first example application selection group, wherein a user has selected eight points to be auto-located by the secondary hardware device. The scrolling will be sequenced in the order selected by the user, regardless of application hierarchy or GUI position. The scrolling may be implemented by device movement, L-R device button clicks, L-Hold or R-Hold device button scrolling, etc.

Figure 10C:
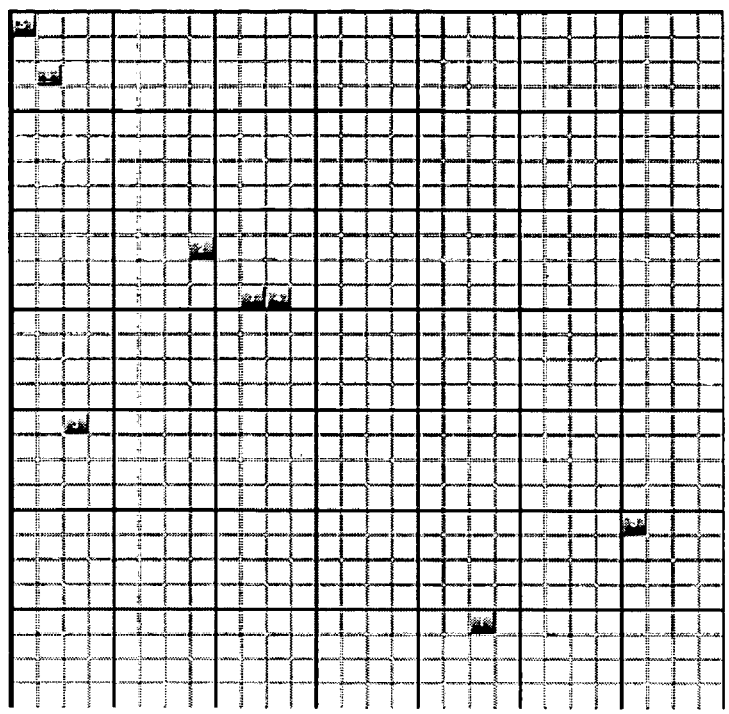
Figure 10D:
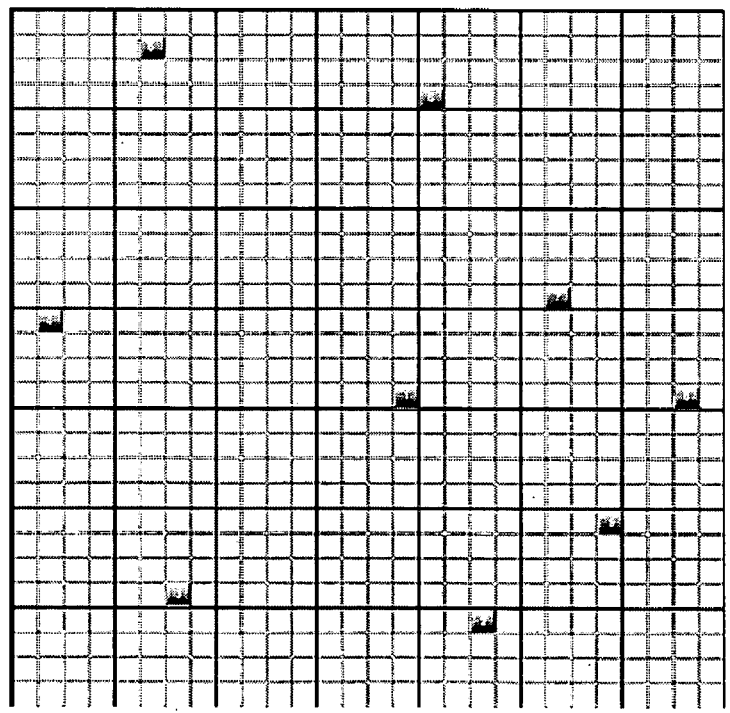

FIG. 10c shows a second example application selection group. Although the same GUI objects have been selected as in FIG. 10b, the sequencing (or priority) has been modified, making this a new objects group which can be saved or otherwise identified by a unique name. FIG. 10d shows a third example application selection group, wherein a new set of control points has been chosen, this time in a circular array. The group will be added to the automating list.

The Objects environment provides a mistake-proof, automated environment for users, since regardless of where a user's hand is moved, the secondary mouse is constrained to select one of the available GUI elements as a target.

As another example, the secondary mouse function can be assigned to an application menu bar, such that when the secondary mouse is moved horizontally it selects across different menus or categories (for example File, Edit, View, Insert, Tools, Window, Help, etc.) effortlessly and without guidance, and when it is moved vertically the elements in the respective menus or categories are selected.

Such an Objects environment provides benefits in terms of speed, added navigational certainty, and stress relief. The environment can be made available to either or both hands in a two-mouse input system, or alternatively within selected application regions in a one-mouse system.

An implementation of the Objects environment may comprise a software development kit (SDK) facilitating development of software applications using multiple independent inputs. Such an SDK allows designation of one or more mice inputs as operating in Objects mode. Once an input has been thusly designated, there is no longer a cursor on the screen depicting its location and it ceases to generate standard positional mouse messages. Its purpose is to map fine-grain mouse movements into coarse grain movements between virtual objects. As described above, this simplifies the physical movements necessary to migrate a "light box" (i.e. active selection) between onscreen elements. In one embodiment, the interaction of the input with the SDK is governed as described below:

1. An application developer registers with the SDK virtual objects which correspond to "real" on-screen user interface controls.

2. The mapping from virtual objects to real onscreen objects is managed by the application developer.

3. A virtual object graph defines the relative (not absolute) positions of objects. For example, let an object A be currently selected. The SDK communicates to the application that the object is active. If a user clicks on the object, the SDK communicates to the application that the object has been clicked. If the user moves the input device towards a direction, and there is a registered object in that direction, that object will be selected. For example, the SDK may use a basic grid system (grid map) where each object can be placed into a grid cell, allowing objects to have at most four immediately accessible neighbors, with every registered object having the same logical space. Other grid systems can be used as well which allow other topologies and fewer or more numerous neighbors per object.

4. A parameter of the SDK will be the "movement resolution", indicating the distance of travel needed by the mouse to constitute a transition from object to object.

5. A virtual object will be bound by an identifier (such as NAME) to the application object.

6. An "object map" indicates the organization of named virtual objects.

7. An "objects session" indicates an instantiated map bound to application objects.

8. The SDK optionally allows the user to persist and retrieve object sessions. For example, the user may load and bind an object map for a particular pointer A, and later in the application may decide to switch to a different map.

9. The SDK may allow the application to set the active object.

10. The SDK may trap movement requests and block movement, for example during modal dialog operations, etc.

11. The SDK may transition in and out of Objects mode at will. Preferably, the SDK remembers the last known Objects mode and may switch back to the same location when leaving the ordinary cursor mode. Optionally, virtual objects may be allowed to occupy multiple grid cells, be bound to different layout types (for example a hierarchy rather than a grid), and object maps themselves may be organized in a hierarchical fashion.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

We claim:

1. A method for generating multiple independent input data streams, comprising:
   generating input data by a plurality of input devices;
   converting the generated input data from non-mouse devices to mouse-message based data;
   sending the input data to a controller for processing;
   wherein the input data are based on a high priority OS message framework, and wherein the processing comprises processing by software subroutines which separate the input data into a plurality of independent input streams according to the plurality of input devices;
   creating a cursor assistance environment for each input stream from each input device wherein input stream movements are at least one of an unrestricted mode and a restricted mode, wherein in the unrestricted mode the input stream cursor is visible and generates standard positional mouse messages, and in the restricted mode the input movements are restricted to chosen graphical user interface elements for accessing the functionality and control points of said elements and wherein the associated cursor remains hidden; and
   passing each of the plurality of independent input streams to listening applications.

2. The method of claim 1, wherein the high priority OS message framework is an OS provided framework for processing mouse-messages.

3. The method of claim 2, further comprising:
   processing the data in order to separate the data into a plurality of independent input streams according to the plurality of input devices.

4. The method of claim 3, wherein the input streams are for processing by a piece of software that accepts multiple independent inputs.

5. The method of claim 3, wherein the processing comprises parsing or tagging the input streams.

6. The method of claim 5, wherein the processing is performed by one or more software subroutines.

7. The method of claim 6, wherein the one or more software subroutines are integrated at a low level of an operating system, thereby enabling fully functional priority processing of the input data.

8. The method of claim 3, further comprising:
   sending an input stream of the plurality of input streams to a software application.

9. The method of claim 2, wherein the generating comprises:
   querying an input device decoder for movement and receiving a value of a movement counter of the decoder; and
   using the received value of the movement counter to generate input data.

10. The method of claim 9, wherein a latency of the querying and generating steps is relaxed when the value of the movement counter indicates a slowing down of input device movement, and the latency of the querying and generating steps is tightened when the value of the movement counter indicates a speeding up of input device movement.

11. The method of claim 9, wherein the input data comprises an indication of a horizontal mouse movement or a vertical mouse movement.

12. The method of claim 11, wherein the decoder is part of a rotary encoder or a linear encoder.

13. The method of claim 1, wherein an input device of the plurality of input devices senses motion.

14. The method of claim 13, wherein the input device is chosen from the group consisting of a mouse, a mouse-based pen, a mouse-based tablet, a data fader, a mouse-based pad and a mouse-based rotary encoder.

15. The method of claim 13, further comprising:
   sensing motion for generating the input data.

16. The method of claim 15, the sensing comprising restricting non-dominant hand gestures to one or more controls that do not require fine motor control, and further comprising mapping fine-grain mouse movements into coarse grain movements between virtual objects.

17. A system for generating multiple independent input data streams, comprising:
   an encoder element for:

generating input data by a plurality of input devices;

converting the generated input data from non-mouse devices to mouse-message based data;

sending the input data to a controller for processing;

wherein the input data are based on a high priority OS message framework, and wherein the processing comprises processing by software subroutines which separate the data into a plurality of independent input streams according to the plurality of input devices;

creating a cursor assistance environment for each input stream from each input device wherein input stream movements are at least one of an unrestricted mode and a restricted mode, wherein in the unrestricted mode the input stream cursor is visible and generates standard positional mouse messages, and in the restricted mode the input movements are restricted to chosen graphical user interface elements for accessing the functionality and control points of said elements and wherein the associated cursor remains hidden; and passing each of the plurality of independent input streams to listening applications.

18. The system of claim 17, wherein the high priority OS message framework is an OS provided framework for processing mouse-messages.

19. The system of claim 18, the encoder element further for:

processing the data in order to separate the data into a plurality of independent input streams according to the plurality of input devices.

20. The system of claim 19, wherein the input streams are for processing by a piece of software that accepts multiple independent inputs.

21. The system of claim 19, wherein the processing comprises parsing or tagging the input streams.

22. The system of claim 21, wherein a first input device of the plurality of input devices is a first mouse attached to a first computer for use by a first student, a second input device of the plurality of input devices is a second mouse attached to a second computer for use by a second student, a third input device of the plurality of input devices is a third mouse attached to a third computer for use by an instructor, and wherein the controller displays three cursors, according to the three mice, on a screen, thereby allowing the two students and the instructor to interact within a virtual environment.

23. The system of claim 17, wherein an input device of the plurality of input devices senses motion.

24. The system of claim 23, wherein the input device is chosen from the group consisting of a mouse, a mouse-based pen, a mouse-based tablet, a data fader, a mouse-based pad and a mouse-based rotary encoder.

25. The system of claim 23, the encoder element further for:

sensing motion for generating the input data.

26. The system of claim 25, the sensing comprising restricting non-dominant hand gestures to one or more controls that do not require fine motor control, and further comprising mapping fine-grain mouse movements into coarse grain movements between virtual objects.

* * * * *